Figures 1, 2:
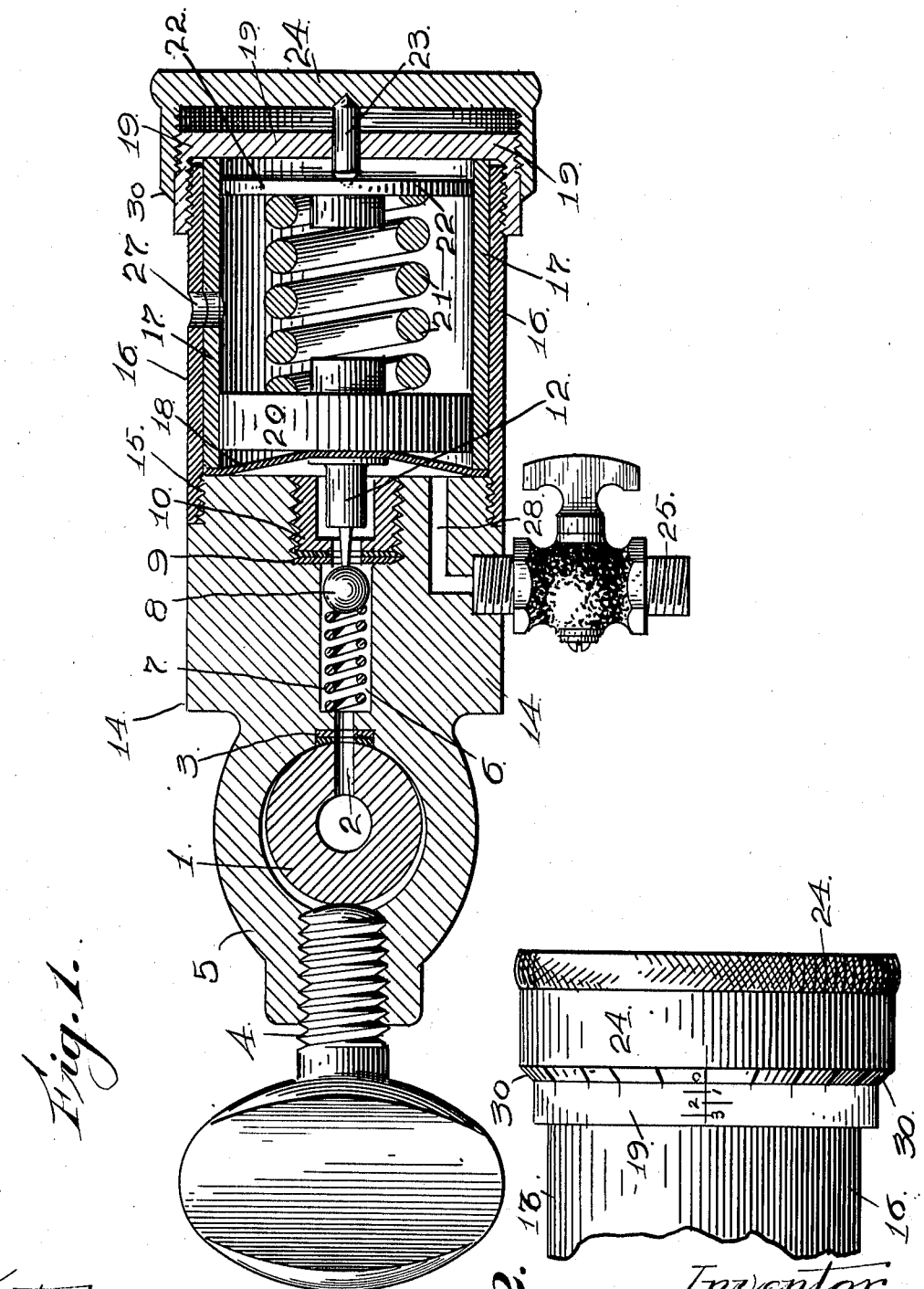

A. L. KOENIG.
PRESSURE REDUCING GAGE.
APPLICATION FILED FEB. 23, 1910.

1,003,916.

Patented Sept. 19, 1911.

Witnesses:
Arthur L. Slee.
Heinrich Stahl.

Inventor
Alphonso L. Koenig

UNITED STATES PATENT OFFICE.

ALPHONSO L. KOENIG, OF SAN FRANCISCO, CALIFORNIA.

PRESSURE-REDUCING GAGE.

1,003,916.   Specification of Letters Patent.   Patented Sept. 19, 1911.

Application filed February 23, 1910. Serial No. 545,507.

*To all whom it may concern:*

Be it known that I, ALPHONSO L. KOENIG, a subject of the Emperor of Austria-Hungary, residing in the city and county of San Francisco and State of California, have invented certain new and useful Improvements in Pressure-Reducing Gages, of which the following is a specification.

This invention relates to pressure reducing gages, one object thereof being to provide a device of this character which can be secured upon the pipe which conveys the pressure fluid without further additional construction than to make a perforation in said pipe.

A further object is to provide a device of this character in which the parts shall be well adapted to prevent the leakage of the pressure fluid, and is capable of easy and quick adjustment from time to time as the condition of the device may require.

Figure 1 is a longitudinal section on an enlarged scale of my pressure reducing gage. Fig. 2 is a broken end view in elevation, showing the method of adjusting the pressure.

Referring to the drawing, 1 indicates a high pressure pipe, tapped at 2, said tap hole being held firmly against washers or gaskets 3, by the action of a thumb screw 4, screwed into a yoke 5, integral with, or an extension of, a cylindrical casing 14, hereinafter more fully described, said screw pressing against the pipe 1 at the opposite side from the tap 2. This tap 2, leads to a cylindrical chamber 6, in said casing 14, in which chamber is contained a helical spring 7, which maintains a ball 8 seated against washers 9, these washers being perforated in their centers with holes of less diameter than that of the ball 8. Said washers are contained in a threaded cylindrical cavity in said casing and are held to their seat by a hollow plug 10, screwed in said cavity and adapted to receive a valve stem 12.

The cylindrical casing 14 contains the ball valve 8 and the plug 10, and terminates in a reduced threaded portion 15, on which is screwed a cylindrical extension or barrel 16, in which is contained a sleeve 17; said sleeve holding firmly to its seat on the end of the casing, a rubber disk or diaphragm 18, by means of a cap 19, screwed to the opposite end of the barrel 16, and pressing against the end of the sleeve 17.

In contact with the rubber disk 18 is a metallic plunger 20, sliding within the sleeve 17, and held in place by the pressure of a spring 21, which in turn is held in place by a plunger 22, at the opposite end of the sleeve 17.

Extending through the center of the cap 19, is a plug 23, one end of which is in contact with the plunger 22, and the other end with a gage cap 24, screwed to the primary cap 19. An outlet 25 is provided from one side of the rubber disk 18 to carry off the pressure fluid. An escape outlet 27 is provided between the plungers 20 and 22, so that the movement of the plunger 20 may not be hampered by the compression of the air therein.

The operation is as follows: Supposing that the pressure in the pipe 1 to be 500 pounds, and it is desired to maintain a pressure at the outlet 25 of, say, 100 pounds; the cap 24 is turned upon its screw threads, thus causing the plug 23 to act on the plunger 22 and compress the spring 21 to a tension representing 100 pounds, as indicated by the graduations shown on the exterior of the cap 19. This pressure, acting on the valve stem 12, pushes the ball 8 away from its seat, thus allowing the pressure fluid to enter by passing through the tap 2, channel 6, hole in plug 10, channel 28, and outlet 25, until 100 pounds pressure is maintained. Should the pressure at any time exceed 100 pounds, the spring 21, being able to resist 100 pounds only, is instantly compressed, allowing the plunger 20 to recede, and the ball 8 to become seated by the tension of the spring 7, thus effectively closing the valve against further pressure. As soon as the pressure within the rubber disk 18 is less than 100 pounds, it is immediately overcome by the 100 pound tension of said spring 21, which again re-acts through the valve piece 12, unseating the ball 8, and admitting more pressure. It will thus be seen that it will not be possible to maintain any other than a pre-determined pressure at the outlet 25. The instant that the initial pressure exceeds the pressure of the spring 21, said excessive pressure will instantly overcome said spring pressure, allowing the plunger 20 to recede and close the valve against further pressure fluid. When the valve 8 is closed, the pressure of the spring 7, in conjunction with the initial pressure, tends to keep the valve 8 closed and the greater the pressure the tighter will the valve be held to its seat, thus destroying any tendency on the part of the valve to "creep".

In order to properly gage the pressure of the spring 21, its pressure is in direct ratio with the pitch of the screw thread of the cap 24, one pitch or one revolution corresponding to 100 pounds pressure. Parts of a revolution are determined by radial graduations upon the beveled face 30 of the cap 24, thus giving an accurate setting for any given pressure within the scope of the gage.

I claim:—

1. In a reducing pressure gage, the combination of a cylindrical casing having an apertured extension to surround a pressure fluid pipe, a regulating gage carried by said casing, the wall of said aperture having a recess and a conduit leading from said recess to said gage, a washer in said recess, and a screw screwed through said extension into said aperture on the opposite side thereof from said recess, substantially as described.

2. The combination of a casing having means for attaching it to a pressure fluid pipe and having a conduit therein which can be connected with the interior of said pipe, a valve in said conduit, a stem for said valve, a hollow plug surrounding said stem and screwed into a cavity in said casing, and a washer secured between the end of said plug and the bottom of said cavity and forming a seat for the valve, substantially as described.

3. The combination of a casing having means for attaching it to a pressure fluid pipe, a barrel screwed on the end of said casing, a sleeve within the barrel, a diaphragm secured between said casing and the inner end of said sleeve, a pressure regulating valve attached to said diaphragm, and a screw cap screwed upon the barrel and pressing against the outer end of said sleeve to hold the diaphragm firmly to its seat, substantially as described.

4. The combination of a casing provided with means for securing it to a pressure fluid pipe, a barrel secured to said casing, a cap secured to said barrel and having a central aperture, a pin through said aperture, regulating valve mechanism engaged by said pin, and an outer cap screwed upon the inner cap and engaging said pin, substantially as described.

5. The combination of a casing having an aperture and a conduit leading from said aperture, the wall of said aperture being recessed around said conduit, a washer in said recess, a screw screwed through said casing into said aperture, a valve for controlling the passage of fluid through said conduit, a diaphragm operatively connected with said valve, a sleeve engaging the edge of said diaphragm to hold it to said seat, a screw cap, a spring for imparting pressure to said diaphragm adapted to engage the outer end of said sleeve to force the inner end against the diaphragm, and means for imparting pressure to said spring, comprising a pin passed through said screw cap and an adjustable device for imparting pressure to said pin, substantially as described.

6. The combination of a casing provided with means for securing it to a pressure fluid pipe, a barrel secured to said casing, a cap secured to said barrel and having a central aperture, a pin through said aperture, regulating valve mechanism engaged by said pin, and an outer cap screwed upon the inner cap and engaging said pin, said outer cap being provided with graduation marks for indicating the degree of pressure, substantially as described.

7. The combination of a casing having an aperture and a conduit leading from said aperture, the wall of said aperture being recessed around said conduit, a washer in said recess, a screw screwed through said casing into said aperture, a valve for controlling the passage of fluid through said conduit, a diaphragm operatively connected with said valve, a sleeve engaging the edge of said diaphragm to hold it to said seat, a screw cap, a spring for imparting pressure to said diaphragm, adapted to engage the outer end of said sleeve to force the inner end against the diaphragm, and means for imparting pressure to said spring, comprising a pin passed through said screw cap and an adjustable device for imparting pressure to said pin, said adjusting device being provided with graduation marks for indicating the degree of pressure, substantially as described.

In witness whereof I have hereunto set my hand this seventeenth day of February A. D. 1910.

ALPHONSO L. KOENIG.

Witnesses:
HEINRICH STAHL,
MARIO SIANNINI.